United States Patent
Masuda et al.

(10) Patent No.: US 10,832,703 B1
(45) Date of Patent: Nov. 10, 2020

(54) DETECTION OF OFF-TRACK READS BETWEEN WRAPS LOCATED IN DIFFERENT TAPE PARTITIONS

(71) Applicant: International Business Machines Corporation, Armonk, NY (US)

(72) Inventors: Setsuko Masuda, Toshima-ku (JP); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/577,058

(22) Filed: Sep. 20, 2019

(51) Int. Cl.
- G11B 15/00 (2006.01)
- G11B 5/008 (2006.01)
- G11B 5/09 (2006.01)
- G11B 20/10 (2006.01)

(52) U.S. Cl.
CPC ............ G11B 5/00813 (2013.01); G11B 5/09 (2013.01); G11B 20/10 (2013.01)

(58) Field of Classification Search
CPC .. G06F 12/0253; G06F 3/0608; G06F 3/0682; G06F 3/0686; G06F 3/0643; G06F 3/0652; G06F 2212/213; G06F 3/064; G11B 5/09; G11B 27/36; G11B 5/54; G11B 5/00; G11B 5/084; G11B 15/005
USPC ............................ 360/48, 54, 53, 77.12, 72.1
See application file for complete search history.

(56) References Cited

U.S. PATENT DOCUMENTS

| | | | | |
|---|---|---|---|---|
| 8,081,396 B2 * | 12/2011 | Katagiri | ............. | G11B 5/00834 360/48 |
| 2006/0277524 A1 * | 12/2006 | Goodman | ........... | G06F 11/1433 717/106 |
| 2012/0179868 A1 | 7/2012 | Haustein | | |
| 2015/0170694 A1 | 6/2015 | Herget | | |
| 2018/0053529 A1 | 2/2018 | Abe | | |

OTHER PUBLICATIONS

"System and Method of Tape Partitioning for Data Tiering", An IP.com Prior Art Database Technical Disclosure, Authors et. al.: Disclosed Anonymously, IP.com No. IPCOM000254467D, IP.com Electronic Publication Date: Jul. 2, 2018, 5 Pages.

* cited by examiner

*Primary Examiner* — Nabil Z Hindi
(74) *Attorney, Agent, or Firm* — Aaron N. Pontikos (57) ABSTRACT

A computer-implemented method for incrementing a tape write pass (WP) value includes identifying an action that requires incrementing a tape WP value on a magnetic tape storage device. The computer-implemented method further includes, in response to identifying the action that requires incrementing the tape WP value on the magnetic tape storage device: assigning a new tape WP value to a dataset based, at least in part, on a partition number corresponding to the data partition in which the dataset is written to.

20 Claims, 6 Drawing Sheets

DETECTION OF OFF-TRACK READS BETWEEN WRAPS LOCATED IN DIFFERENT TAPE PARTITIONS

BACKGROUND

The present invention relates generally to the field of tape storage systems, and more particularly to magnetic tape media having data partitions.

A tape drive is a data storage device that reads and writes data on a magnetic tape. Current versions of magnetic tape data storage allow a tape to be divided into separately writable areas, known as partitions. With the advent of tape partitions, a tape format and file system, known as the Linear Tape File System (LTFS), made it possible to utilize tape in a similar manner to other removable media, such as a USB flash drive or external hard disk drive. Accordingly, under the LTFS, file data and filesystem metadata is stored in separate partitions on the tape, wherein an index presents the file data as if organized into directories.

SUMMARY

According to one embodiment of the present invention, a computer-implemented method for incrementing a tape write pass (WP) value is disclosed. The computer-implemented method includes identifying an action that requires incrementing a tape WP value on a magnetic tape storage device. The computer-implemented method further includes, responsive to identifying the action that requires incrementing the tape WP value on the magnetic tape storage device: assigning a new tape WP value to a dataset based, at least in part, on a partition number corresponding to the data partition in which the dataset is written to.

According to another embodiment of the present invention, a computer program product for incrementing a tape write pass (WP) value is disclosed is disclosed. The computer program product includes one or more computer readable storage media and program instructions stored on the one or more computer readable storage media. The program instructions include instructions to identify an action that requires incrementing a tape WP value on a magnetic tape storage device. The program instructions further includes instructions to, responsive to identifying the action that requires incrementing the tape WP value on the magnetic tape storage device, assign a new tape WP value to a dataset based, at least in part, on a partition number corresponding to the data partition in which the dataset is written to.

According to another embodiment of the present invention, a computer system for incrementing a tape write pass (WP) value is disclosed is disclosed. The computer system includes one or more computer processors, one or more computer readable storage media, and program instructions stored on the computer readable storage media for execution by at least one of the one or more processors. The program instructions include instructions to identify an action that requires incrementing a tape WP value on a magnetic tape storage device. The program instructions further includes instructions to, responsive to identifying the action that requires incrementing the tape WP value on the magnetic tape storage device, assign a new tape WP value to a dataset based, at least in part, on a partition number corresponding to the data partition in which the dataset is written to.

DETAILED DESCRIPTION

Linear tape open (LTO) is a magnetic tape data storage technology. Typically, an LTO formatted tape cartridge includes four wide data bands interleaved between five narrow servo bands. The tape head assembly, that reads from and writes to the tape, straddles a single data band and the two adjacent servo bands. The tape head assembly can have a set of 8, 16, or 32 data read/write head elements (based on the corresponding set of tracks in a single data band) and two (2) servo read elements. All of the tracks in a given set are read or written in a single, one-way, end-to-end pass (i.e., wrap). After making a pass over the whole length of the tape in the longitudinal direction, all tape heads shift slightly in a latitudinal direction (perpendicular to the longitudinal direction of the tape) to access a different wrap within the band (or wraps within other bands), making another pass in the reverse direction. Wraps continue in forward and reverse passes, with slight shifts toward the middle of the band on each pass. This procedure, known as linear serpentine recording, is repeated until all of the tracks in the bands have been written.

Figure 1:
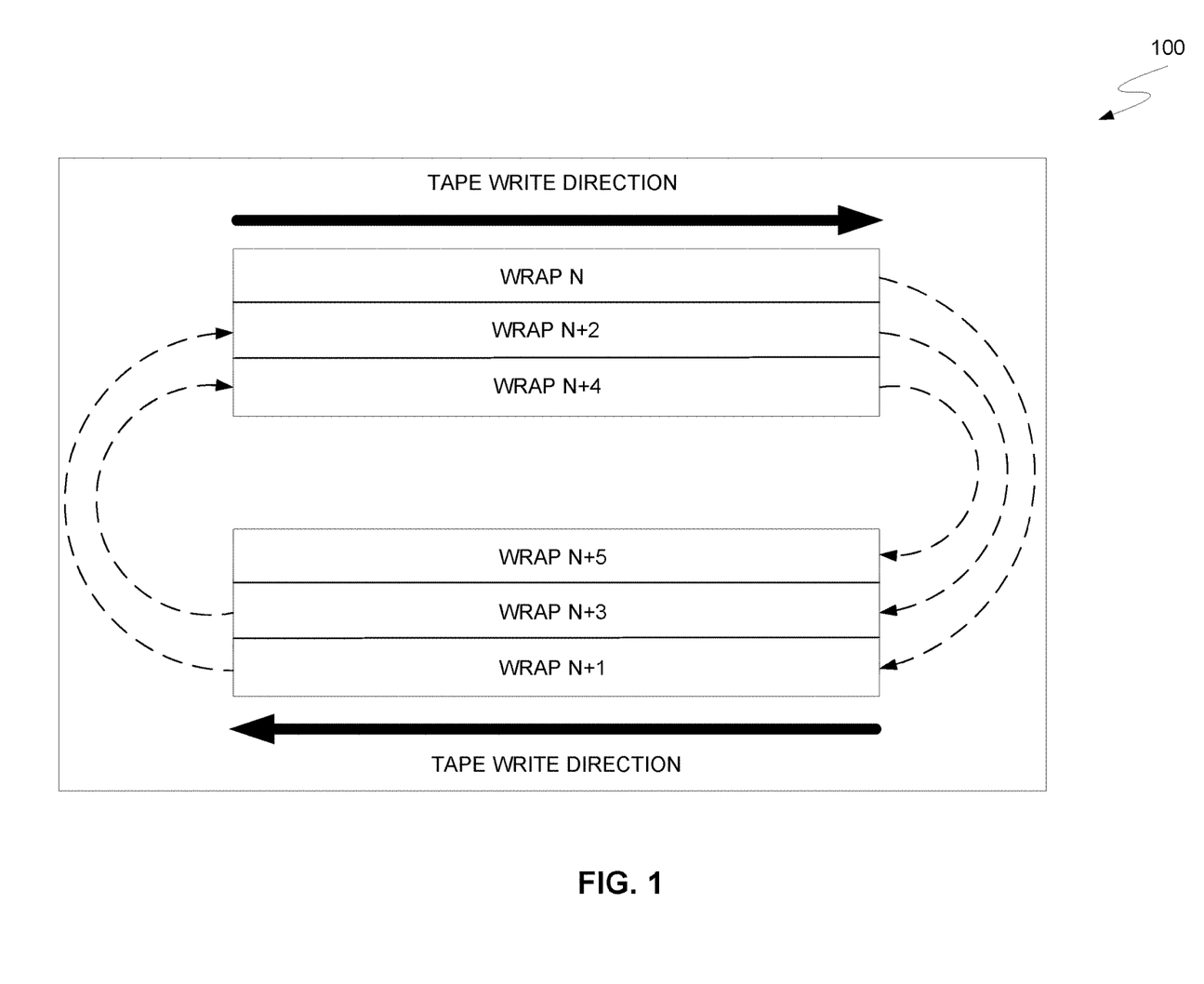
FIG. 1 an exemplary linear serpentine recording, generally designated 100, in accordance with at least one embodiment of the present invention.

Referring now to FIG. 1, an exemplary linear serpentine recording, generally designated 100, in accordance with at least one embodiment of the present invention can be seen. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted in FIG. 1, data recorded in wraps running in the forward direction—Wrap N, Wrap N+2, and Wrap N+4 can be seen. These forward running wraps are arranged on the tape such that even numbered wraps within a data band are adjacent to each other. Similarly, data recorded in wraps running in the reverse direction—Wrap N+1, Wrap N+3, and Wrap N+5 can be seen. These reverse running wraps are arranged on the tape such that odd numbered wraps within a data band are adjacent to each other. As data is written to each subsequent wrap in a common recording direction, irrespective of the particular direction of recording, the next subsequent wrap is positioned closer to the middle of the band.

Whereas the latitudinal direction of the tape is divided into a plurality of wraps, data is written and/or read along the longitudinal direction of the tape for each wrap. Numbers are assigned to each wrap in the order of writing. Typically, wraps are arranged on the tape such that wraps running in the same direction are adjacent to each other. For example, wraps running in a forward direction (i.e., wraps running from the beginning of the tape (BOT) to the end of the tape (EOT) are adjacent to each other. Similarly, wraps running in a reverse direction (i.e., wraps running from EOT to BOT) are adjacent to each other. The number of wraps and the number of tracks within each wrap is dependent on the generation of the LTO cartridge. The width in the latitudinal direction of the wraps (i.e., track pitch) is dependent on the tape width and the number of wraps on the tape. For example, a LTO-2 tape cartridge has 4 data bands and 16 wraps per band, thus requiring 64 passes to fill. On the other hand, a LTO-7 tape cartridge has 4 data bands and 28 wraps per band, thus requiring 112 passes to fill.

Embodiments of the present invention recognize that as tape storage capacities of each generation of LTO cartridge continue to increase, the accuracy of track following has decreased. In order to increase the storage capacity of a LTO cartridge, the track pitch of each subsequent generation becomes increasingly narrower. This stems from the fact that the number of wraps increase while the width of the tape remains constant. A tape drive reads and writes data by aligning a magnetic head to a target wrap (i.e., track following). However, as the track pitch narrows, it becomes increasingly difficult to track the magnetic head to the target wrap. The narrower the track pitch, the greater the likelihood the position of the magnetic head will deviate from the target wrap. This, in turn, results in a greater likelihood in the erroneous reading of data on an adjacent track (i.e., off-track read).

Typically, there are two types of indicators used to distinguish data of one wrap from that of a neighboring or adjacent wrap—tape write pass (WP) and wrap toggle. As data is written to a data partition of a tape by the tape head, corresponding tape (WP) and wrap toggle information is recorded in the cartridge memory (CM) chip of the tape cartridge. The read/write head contains a plurality of read elements and a plurality of write elements arranged to read or write multiple sets of physical tracks of data along the tape simultaneously. As an example, a tape includes four wide data bands interleaved between 5 narrow servo bands. Each data band includes a plurality of wraps and each wrap includes a set of tracks. Ideally, the tape winds itself its entire length from the BOT to the EOT during a tape WP of the tape past the read/write heads of the tape head. One or ordinary skill in the art will appreciate that a tape WP is a single passage of the tape past a write head for writing onto a single track, irrespective of whether the tape speed varies, or whether the tape stops during the pass. During a backup operation, the tape may traverse the read/write head in forward and reverse directions a number of different times, in a plurality of different tape WPs. Accordingly, a tape WP may include a sequence of writes which cause data to be written sequentially along one or more tracks, which are themselves written in sequence.

A tape WP is recorded as a numerical value for identifying the "newness" of a dataset written to the tape with respect to prior datasets written to the tape. Typically, the tape WP number corresponding to the last data record written to a particular wrap is stored in the nonvolatile memory (e.g., CM chip) embedded in a LTO tape cartridge. A CM chip holds information on data locations, usage/error logs, and user areas. A radio frequency interface is used to eliminate any needs for physical contacts, which ultimately provides quick reference to the cartridges index and usage information, after being loaded into a tape drive.

For example, a tape drive sets the same tape WP value for a dataset associated with a common write stream operation (i.e., data written to the tape in a single operation that is devoid of rewriting, changing direction, or seeking a location of data on the tape). In some instances, datasets written to the tape media have the same dataset number. In such instances, a dataset which is last written (i.e., the newest recorded version of the dataset) is adopted and the older version of the dataset is discarded. In order to distinguish the newest version of a dataset, a tape WP is assigned to each dataset, in which the dataset having the highest WP is the latest dataset. For example, two datasets having a common dataset number N are written to a tape and are assigned WP values of X and X+1, respectively. Accordingly, in response to receiving a read request for dataset N, the first dataset having a WP value of X will be discarded or skipped over and the read operation will be performed on dataset N having a WP value of X+1 since this dataset has a higher WP value.

According to the LTO format, the tape WP is incremented when any of the following operations are performed: appending data written to a tape, rewriting data written to a tape (e.g., for purposes of error recovery), and when a wrap change occurs (the tape WP is incremented as the wrap number increases). In some instances, a tape only includes a single data partition. In these instances, a wrap change occurs based on a change in direction of the tape at the end of the tape. Thus, the tape WP is incremented when changing direction from a forward recording direction to a reverse recording direction at the end of the tape, and vice versa. In other instances, a tape is divided into multiple data partitions that partition the tape in a horizontal or longitudinal direction (i.e., the partitions run lengthwise across the entire length of the tape). In these instances, the tape WP is also incremented when the tape drive switches between partitions when writing data. For example, if a first dataset N is written to partition 1, the dataset N is assigned a WP value of X. However, if a second dataset N+1 is subsequently written to partition 2, the dataset N+1 is assigned a WP value of X+1.

Wrap toggle is a single bit value that indicates the value of the lower second bit of the wrap number to distinguish adjacent wraps. For example, the wrap toggle can be used to distinguish adjacent wraps within the same band. According to the LTO format, even value wraps within a common band (e.g., wraps N, N+2, and N+4 depicted in FIG. 1) are adjacent to each other in increasing order of wrap number. Similarly, odd value wraps (e.g., wraps N+1, N+3, and N+5 depicted in FIG. 1) are adjacent to each other in increasing order of wrap number. The wrap toggle alternates between a value of zero (0) and a value of (1) for each successive even numbered wrap in a particular band. Similarly, the wrap toggle alternates between a value of zero (0) and a value of (1) for each successive odd numbered wrap in a particular band.

The wrap toggle can be useful to distinguish between adjacent wraps (e.g., wrap N and wrap N+2) when reading or writing data since the wrap toggle between consecutive adjacent wraps is different. For example, the wrap toggle of wrap N is zero (0) and the wrap toggle of wrap N+2 is (1). However, embodiments of the present invention recognize that the wrap toggle cannot be used with certainty to distinguish non-adjacent wraps (e.g., wrap N and wrap N+4 or wrap N+4 and N+8) when reading or writing data since the wrap toggle between non-adjacent wraps is the same. For example, the wrap toggle of wrap N is zero (0) and the wrap toggle of wrap N+4 is also zero (0). Accordingly, the inability to distinguish non-adjacent wraps having the same wrap toggle value can lead to an inability to identify off-track reading.

In those instances where a tape only has a single data partition, off-track reading can be detected based on identifying data being read from an abnormally high tape WP with respect to the tape WP corresponding to the intended data to be read, regardless of whether the intended wrap to be read and the wrong wrap actually being read from have the same wrap toggle value. For example, it can be determined from a CM of a tape that the WP values on Wrap N range between 1 and 10 based on the last record written on Wrap N having a value of 10. Similarly, it can be determined from a CM of a tape that the WP values on Wrap N+4 range between 80 and 90 based on the last record written on Wrap N+3 having a value of 79 and the last record written on Wrap N+4 having a value of 90. This stems from the fact that according to the LTO format, the lowest WP value of each subsequent wrap is calculated from the highest WP value of the previous wrap. In other words, the lowest WP value of a subsequent wrap is 1 greater than the highest WP of a previous wrap. If a read request for data on wrap N is received, and the tape drive inadvertently begins to read data from wrap N+4, even though wrap N and wrap N+4 have the same wrap toggle value, it can be determined that off-track reading is occurring based on the data on Wrap N+4 having higher WP values than the highest WP values of data on Wrap N. In other words, since the read request is directed towards data written on Wrap 0, the WP value of the intended data to be read should have a WP value equal to or lower than 10.

However, embodiments of the present invention recognize that in those instances where a tape has multiple data partitions, off-track reading cannot be detected solely based on identifying data being read from an abnormally high tape WP with respect to the tape WP corresponding to the intended data to be read. Generally, an LTO formatted tape can include up to four data partitions. In those instances where an LTO formatted tape is partitioned in the longitudinal direction along the entire length of the tape media, wraps adjacent to the N+4 wrap or N+8 wrap (i.e., wraps having a common wrap toggle value) can be located within different partitions (e.g., wrap N+4 is located in Partition 0 and wrap N+8 is located in Partition 1). Whereas the tape WP value increases each time a tape drive switches writing between partitions, it becomes increasingly difficult to distinguish non-adjacent wraps by tape WP alone. This stems from the fact that the WP value of data written in a previous partition (e.g., data written to wrap N+4 located in Partition 0) can have a higher WP value than data written to a subsequent partition (e.g., data written to wrap N+8) located in Partition 2. Accordingly, off-track reading can no longer be detected based on identifying data being read from an abnormally high tape WP since the intended data to be read (e.g., data written to wrap N+4 located in Partition 0) may actually have a WP value that is higher than that of the data erroneously being read from on an adjacent track (e.g., data written to wrap N+8 located in Partition 1).

Figure 2:
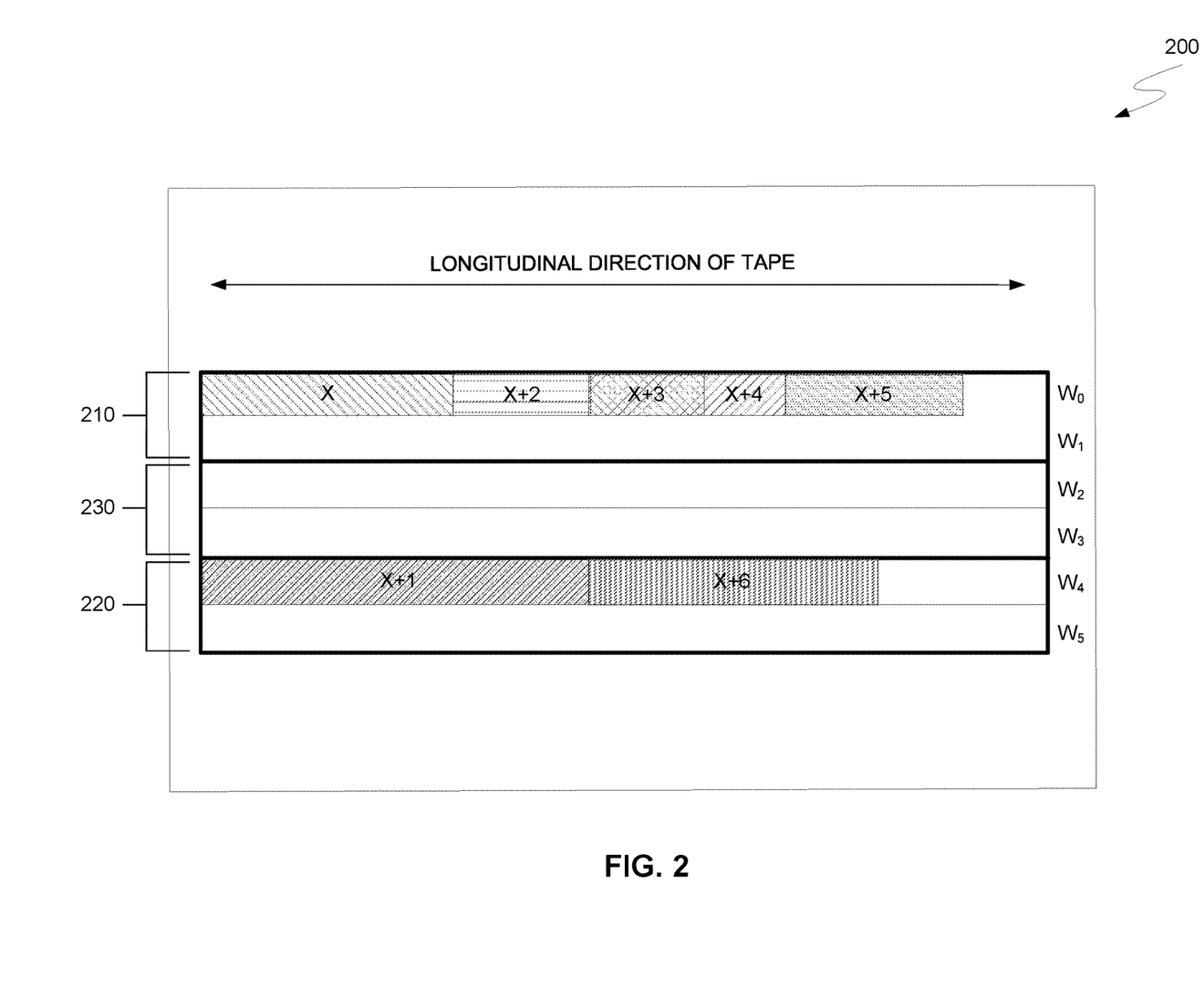
FIG. 2 is an exemplary partitioned magnetic tape media, generally designated 200, in accordance with at one embodiment of the present invention.

Referring now to FIG. 2, an exemplary partitioned magnetic tape media, generally designated 200, in accordance with at least one embodiment of the present invention can be seen. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

As depicted in FIG. 2, a tape is partitioned in the longitudinal direction and includes two data partitions—data partition 210 and data partition 220. Data partition 210 includes $Wrap_0$ ($W_0$) and $Wrap_1$ ($W_1$). Data partition 220 includes $Wrap_4$ ($W_4$) and $Wrap_5$ ($W_5$). Data partition 210 and data partition 220 are separated by guard wrap 230, which includes $Wrap_2$ ($W_2$) and $Wrap_3$ ($W_3$). One of ordinary skill in the art will appreciate that a guard wrap is a wrap that serves as a buffer or physical boundary that separates data partitions in order to maintain data integrity when writing to the last wrap and the first wrap of adjacent partitions, respectively. For example, data written to the last wrap of data partition 210 will only interfere with guard wrap 230 that separates data partition 210 from data partition 220 and thus, data integrity of data written to the first wrap of data partition 220 is maintained when writing data to the last wrap of data partition 210. Similarly, data written to the first wrap of data partition 220 will only interfere with guard wrap 230 that separates data partition 220 from data partition 210 and thus, data integrity of data written to the last wrap of data partition 210 is maintained when writing data to the first wrap of data partition 220.

As an example, if the tape head writes data in $W_4$ located in data partition 220 and moves vertically to data partition 210 and writes data on $W_0$ located in data partition 210, the tape WP associated with $W_0$ is higher than the tape WP associated with $W_4$ since the tape WP is incremented when a tape drive head switches writing between data partitions. Additionally, if the tape head frequently switches writing data to different partitions, the wrap number in which data is being written to can not longer be determined by the tape WP stored in the CM since the value of the tape WP is incremented each time the tape head moves from one partition to another.

As an example, data is written in Partition 210. One of ordinary skill in the art will appreciate that according to LTO formatting rules, the WP value of the last dataset written on a wrap is stored in the CM. Thus, a WP value of X for Partition 210 is stored in the CM. Next, a tape head moves to Partition 220 and writes data to Partition 220. One of ordinary skill in the art will appreciate that according to LTO formatting rules, the WP value is always incremented when switching write operations between different data partitions. Thus, a WP value of X+1 for Partition 220 is stored in the CM. Next, the tape head moves back to Partition 210 and rewrites data written to the tape (e.g., for purposes of error recovery) for four different datasets. One of ordinary skill in the art will appreciate that according to LTO formatting rules, WP is incremented when rewriting data written to the tape. Thus, the WP is incremented to WP X+5 and a WP value of X+5 is stored for Partition 210 in the CM. Lastly, the tape head moves back to Partition 220 and data is written in Partition 220 and a WP value of X+6 for Partition 220 is stored in the CM.

In the previous example, it is impossible to determine which data partition—Partition 210 or Partition 220—that includes, for example, WP X+3 data since the information in the CM is stored as follows: Partition 210—WP X to X+5, and Partition 220—WP X+1 to X+6. One of ordinary skill in the art will appreciate that according to the LTO format specification, only the WP value assigned to the last dataset written to a wrap is stored in the CM. This stems from the fact that the storage capacity of the CM is very small (8 KB) and all of the formatting rules, in addition to WP value tracking, needs to be stored in the CM. Accordingly, the lowest WP value assigned to a dataset written to a subsequent wrap is calculated from the highest WP value of the previous wrap. In the previous example, since the first WP written to a tape will always be X and the highest WP value for Partition 210 is X+5, the tape head would interpret Partition 210 to include datasets having WP values ranging from X to X+5. Similarly, since Partition 220 includes WP values of X+1 and X+6, the tape head would interpret Partition 220 to include datasets having WP values ranging from X+1 to X+6. Thus, whereas a dataset having a WP value of X+3 is actually written to Partition 210, the tape head would be unable to actually determine which partition (Partition 210 or Partition 220) includes WP X+3 data.

Embodiments of the present invention provide for detecting and avoiding off-track reads for data recorded on LTO formatted tapes having partitions. More particularly, embodiments of the present invention provide for detecting and avoiding off-track reads for data recorded on wraps located in different partitions that have the same wrap toggle value. In various embodiments, the Format Identification Dataset (FID) of a LTO formatted tape is modified to include a set of WP increment rules that enables a tape drive head to detect and avoid off-track reads between partitions based on WP value alone. One of ordinary skill in the art will appreciate that the FID is the first dataset written within the user data area of the tape and includes information regarding the format of the tape. It should be appreciated that the set of WP increment rules written to the FID in accordance with the present invention does not require any modification or changes to be made with respect to the LTO format specification of the LTO formatted tape itself. Accordingly, the set of WP increment rules may be practiced in accordance with current versions of LTO formatted tape technologies that support data partitioning.

In various embodiments, WP values for a data partition are limited to a set of WP values prior to recording any data on a tape. The set of WP values for a data partition are stored in the CM of an LTO tape cartridge and are written to the FID of the tape. In some embodiments, the set of WP values for each data partition is determined based, at least in part, on a maximum number of data partitions that can be created for a particular version of a LTO formatted tape cartridge. In other embodiments, the set of WP values for each data partition is determined based, at least in part, on a number of data partitions actually created on a LTO formatted tape cartridge. It should be noted that throughout this specification, the maximum number of data partitions that can be created and the number of data partitions actually created may be commonly designated by the value M.

In various embodiments, WP values are assigned to a dataset based on the particular data partition in which the dataset is written to. In various embodiments, WP values assigned to datasets located in the same partition are assigned such that any WP value assigned for a dataset written to the same partition, when divided by M, has a common remainder. For example, all WP values assigned to Partition$_1$ will have a remainder value of one (1). Furthermore, in various embodiments, WP values assigned to datasets located in the same partition are assigned such that any WP value assigned for the same partition, when divided by M, has a remainder value equal to the partition number in which the dataset is written to. For example, all WP values assigned to datasets written to Partition$_1$, when divided by M, will have a remainder value of one (1). This is particularly advantageous in that off-track reads can be identified for data written on adjacent wraps that have the same wrap toggle value, but are located in different partitions based on determining different remainder values.

For example, on a tape having four (4) data partitions—Partitions$_{0-3}$—wrap N+4 is located on Partition$_0$ and wrap N+6 is located on Partition$_1$. If the WP value assigned to the last dataset recorded on wrap N+4 in Partition$_0$ is WP$_{60}$, wrap N+4 is recorded in the CM of the tape cartridge as having a last dataset with a WP value of WP$_{60}$. Similarly, if the WP value assigned to the last dataset recorded on wrap N+6 in Partition$_1$ is WP$_{13}$, wrap N+6 is recorded in the CM of the tape cartridge as having a last dataset with a WP value of WP$_{13}$. Accordingly, if a read request for data recorded on wrap N+4 is received, but the tape head erroneously begins reading data recorded on wrap N+6, this off track read is identifiable by the present invention. Since the WP values of datasets on wrap N+6, when divided by the total number of partitions (4), have remainder values of one (1), it can be determined that the tape head is reading data from a wrong wrap located in Partition$_1$ since the WP values of datasets on wrap N+4, when divided by the total number of partitions (4), have remainder values of zero (0).

In various embodiments, for any given partition, the maximum WP value assigned to a dataset written to a partition is used to calculate the next WP value assigned to a subsequent newly written dataset. Accordingly, each subsequent WP value assigned to a newly written dataset in a particular partition is incremented such that the WP value, when divided by M, has the same WP remainder (%) as all of the older, previously written datasets within the partition.

An exemplary set of WP values for a tape partitioned into 4 data partitions in accordance with at least one embodiment of the invention is illustrated as follows:

Partition 0 (WP %=0): WP$_4$, WP$_8$, WP$_{12}$, WP$_{16}$, WP$_{20}$ . . .
Partition 1 (WP %=1): WP$_5$, WP$_9$, WP$_{13}$, WP$_{17}$, WP$_{21}$ . . .
Partition 2 (WP %=2): WP$_6$, WP$_{10}$, WP$_{14}$, WP$_{18}$, WP$_{22}$ . . .
Partition 3 (WP %=3): WP$_7$, WP$_{11}$, WP$_{15}$, WP$_{19}$, WP$_{23}$ . . .

In some embodiments, the WP values are managed by storing the largest WP value on the tape in the CM. If the tape cartridge is a LTO formatted tape cartridge, the WP value after partition switching is based on the rule of addition from the maximum WP on the tape before moving. Accordingly, when the position of the tape head switches between data partitions, the maximum WP on the tape stored in the CM is referenced, and the value of the WP to be used next is calculated from the maximum value. In other words, the value of the WP to be used next is calculated from the maximum WP value assigned to a dataset written on any of the partitions. This stems from the fact that if data is written in accordance with the LTO format specification, WP values cannot be decremented.

For example, the highest WP value of a dataset (e.g., dataset D+15) written in Partition$_1$ is X+17. After writing dataset D+15 to Partition 1, the tape head switches from Partition$_1$ to Partition$_3$ to write another dataset (e.g., dataset D+16) in Partition$_3$. Prior to writing dataset D+16 in Partition$_3$, the highest WP value of a dataset (e.g., dataset D+9) written in Partition$_3$ is X+7. According to the exemplary set of WP values listed above, the next WP value that may be assigned to dataset D+20 is X+11. However, a WP value of X+11 cannot be assigned to dataset D+16 since WP values cannot be decremented (i.e., X+11 is less than X+17). If the highest WP value recorded in the CM of the tape cartridge is X+17, then the next WP value assigned to dataset D+16 is X+19 since the first WP value in the set of WP values for Partition₃ that is higher than X+17 is X+19. In other words, X+19 is the first WP value in the set of WP values that has a remainder of 3, when divided by M, that is greater than the highest WP value recorded in the CM (X+17).

In some embodiments, if the tape cartridge is not a LTO formatted tape cartridge, each data partitions maximum WP can be stored in the CM and the rule of addition is used. Accordingly, when the position of the tape head switches between data partitions, the maximum WP on a particular partition stored in the CM is referenced, and the value of the WP to be used next is calculated from the maximum WP value for a particular partition. In other words, the value of the WP to be used next is calculated from the maximum WP value assigned to the partition in which a dataset is to be written to. This stems from the fact that if data does not have to be written in accordance with the LTO format specification, WP values can be decremented.

For example, the highest WP value of a dataset (e.g., dataset F+15) written in Partition₁ is X+17. After writing dataset F+15 to Partition₁, the tape head switches from Partition₁ to Partition₃ to write another dataset (e.g., dataset F+16) in Partition₃. Prior to writing dataset F+16 in Partition₃, the highest WP value of a dataset (e.g., dataset F+9) written in Partition₃ is X+7. According to the exemplary set of WP values listed above, the next WP value that may be assigned to dataset F+16 is X+11. Even though the WP value of X+11 is less than the highest WP value recorded in the CM (X+17 assigned to dataset F+15 in Partition₁), a WP value of X+11 is assigned to dataset F+16 after being written in Partition₃ since X+11 is higher than the prior highest WP value assigned to a dataset (X+7 assigned to dataset F+9) written to Partition₃.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3:
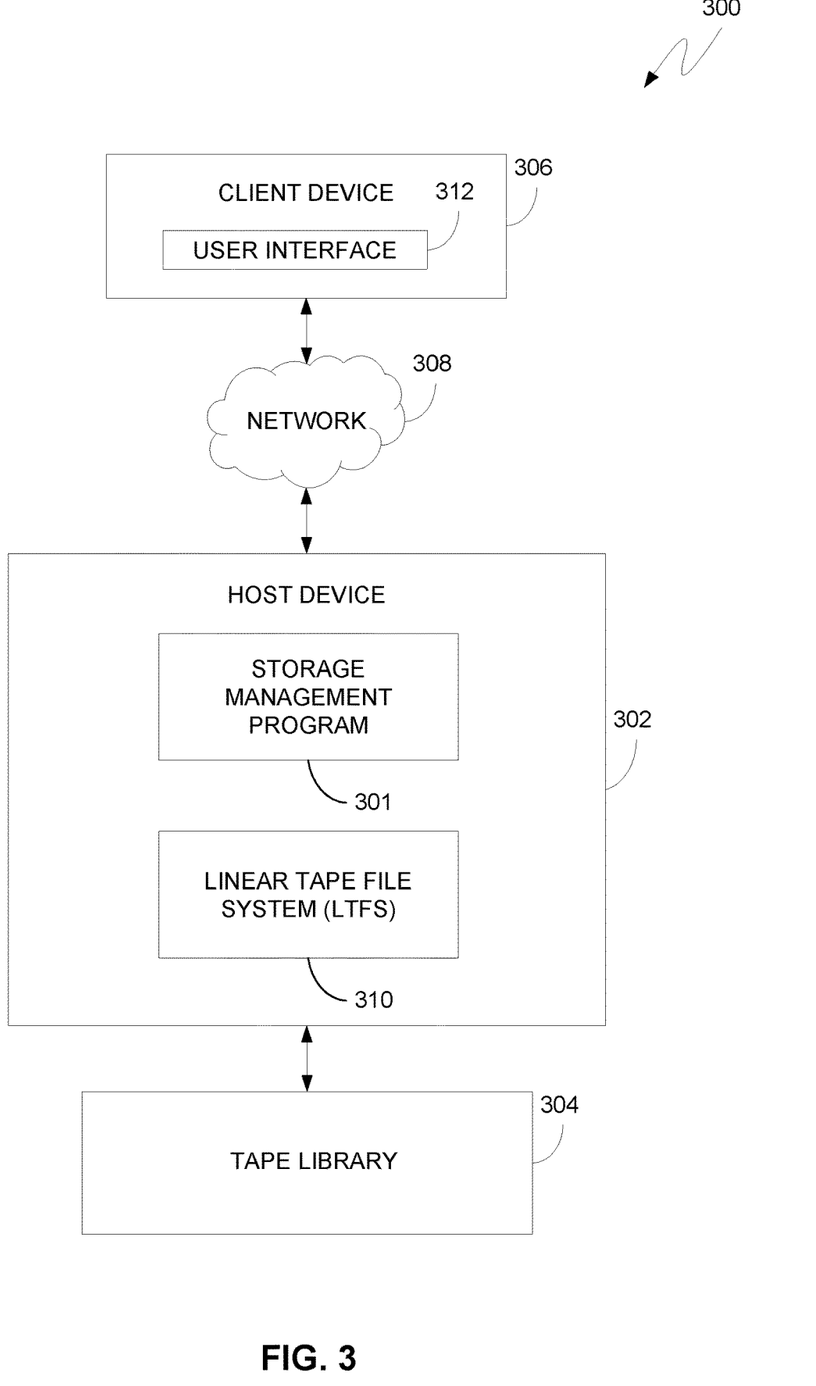
FIG. 3 is a functional block diagram of a network computing environment, generally designated 300, suitable for operation of a WP management program 301 in accordance with at least one embodiment of the invention.

Referring now to various embodiments of the invention in more detail, FIG. 3 is a functional block diagram of a network computing environment, generally designated 300, suitable for operation of a WP management program 301 in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 300 includes host device 302, tape library 304, and client device 306 interconnected over network 308. In embodiments of the invention, network 308 can be a telecommunications network, a local area network (LAN), a wide area network (WAN), such as the Internet, or a combination of the three, and can include wired, wireless, or fiber optic connections. Network 308 may include one or more wired and/or wireless networks that are capable of receiving and transmitting data, voice, and/or video signals, including multimedia signals that include voice, data, and video information. In general, network 308 may be any combination of connections and protocols that will support communications between host device 302, tape library 304, client device 306, and other computing devices (not shown) within network computing environment 300.

In various embodiments of the invention, host device 302 is a computing device that can be a standalone device, a management server, a web server, a mobile device, or any other electronic device or computing system capable of receiving, sending, and processing data. In other embodiments, host device 302 represents a server computing system utilizing multiple computers as a server system, such as in a cloud computing environment. In an embodiment, host device 302 represents a computing system utilizing clustered computers and components (e.g. database server computers, application server computers, web server computers, etc.) that act as a single pool of seamless resources when accessed within network computing environment 300. In general, host device 302 represents any programmable electronic device or combination of programmable electronic devices capable of executing machine readable program instructions and communicating with WP management program 301, tape library 304, client device 306, and other computing devices (not shown) within network computing environment 300 via a network, such as network 308.

Host device 302 includes WP management program 301. Although WP management program 301 is depicted in FIG. 3 as being integrated with host device 302, in alternative embodiments, WP management program 301 is remotely located from host device 302. For example, WP management program 301 is located on tape library 304. In some embodiments, WP management program 301 is a component LTFS 310. For example, WP management program 301 is a software component or sub-system of LTFS 310. In other embodiments, WP management program 301 is logically distinct from LTFS 310.

In some embodiments, host device 302 includes linear tape file system (LTFS) 310. In other embodiments, host device 302 does not include LTFS 310. A linear tape file system (LTFS) is a file system that allows files stored on tape cartridges in a tape library to be accessed in a similar fashion as files stored on a hard disk or flash drive. It requires both a specific format of data on the tape media and software to provide a file system interface to the data. Each LTFS formatted tape cartridge in the library appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 310 is an IBM Linear Tape File System-Library Edition (LTFS-LE) that allows LTFS volumes (i.e., tape media) to be used with a tape library, such as tape library 304. While reference is made to IBM-specific hardware and/or software components, it should be understood that aspects of the present invention may be applied equally to other tape library technologies. Each LTFS-formatted tape media in tape library 304 appears as a separate folder under the file system mount point.

One of ordinary skill in the art will appreciate that although data stored in a LTFS appears to behave like data stored on a hard disk, the fundamental sequential nature of writing data to magnetic tape media remains. Data is sequentially written to zones (i.e., logical blocks) of a predetermined, fixed size and files are always appended to the end of the tape media. Furthermore, a LTFS is a write-once file system. In other words, if a file stored on one or more data blocks is modified, overwritten or removed from a tape image, the associated data blocks are not freed up. Rather, the memory allocated to the associated data blocks becomes invalid (i.e., the associated data blocks are no longer referenced in an index) and newly added data is written as separate, non-contiguous blocks at the end of the tape media.

Although LTFS 310 is depicted in FIG. 3 as being integrated with host device 302, in alternative embodiments, LTFS 310 is remotely located from host device 302. For example, LTFS 310 is located on tape library 304. In some embodiments, LTFS 310 is a component of WP management program 301. For example, LTFS 310 is a software component or sub-system of WP management program 301. In other embodiments, LTFS 310 is logically distinct from WP management program 301.

Tape library 304 is an automated tape storage device that includes a plurality of tape drives for writing to and reading from tape media, such as single-reel or two-reel magnetic tape cartridges. For example, tape library includes LTO formatted tape cartridges. In an embodiment, tape library 304 is an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 304 includes a plurality of tape media stored in banks or groups of storage slots. For example, tape media may include, but is not limited to magnetic tape cartridges, magnetic tape cassettes, and optical tape cartridges. Tape library 304 further includes a plurality of slots to hold tape cartridges, a barcode reader to identify tape cartridges and an automated method (e.g., a robot) for loading tapes.

Client device 306 allows a user to access an application running on host device 302 and/or communicate with WP management program 301 and/or tape library 304 in order to write data to and retrieve data from various tape media via a network, such as network 308. Client device 306 may be a laptop computer, tablet computer, netbook computer, personal computer (PC), a desktop computer, a personal digital assistant (PDA), a smart phone, or any programmable electronic device capable of receiving, sending, and processing data. In general, client device 306 represents any programmable electronic device or combination of programmable electronic devices capable of executing machine readable program instructions and communicating with WP management program 301, host device 302, tape library 304, and other computing devices (not shown) within network computing environment 300 via a network, such as network 308.

Client device 306 includes user interface 312. User interface 312 provides an interface between client device 306, WP management program 301, host device 302, and tape library 304. In some embodiments, user interface 312 is a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In some embodiments, user interface 312 is mobile application software that provides an interface between client device 306, WP management program 301, host device 302, and tape library 304.

Figure 4:
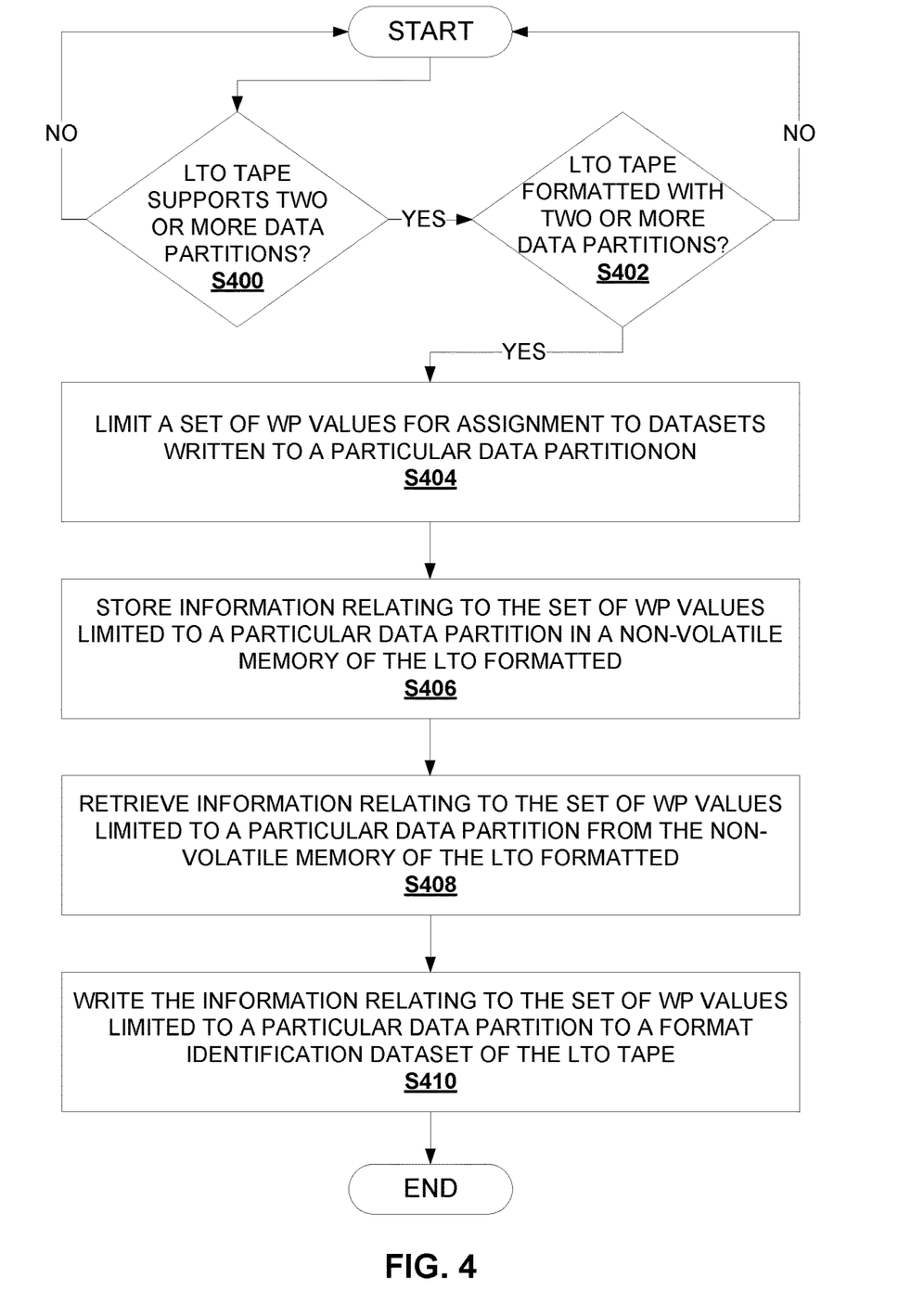
FIG. 4 is a flow chart diagram depicting operational steps for formatting a LTO tape cartridge in accordance with at least one embodiment of the present invention.

FIG. 4 is a flow chart diagram depicting operational steps for formatting a LTO tape cartridge in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims. It should be noted that although the following flow chart diagram is illustrative of formatting a LTO tape cartridge, one of ordinary skill in the art will appreciate that various embodiments of the present invention may be practiced with any form of tape storage device that utilizes a tape WP system.

At step S400, WP management program 301 determines whether a LTO tape can support two or more data partitions. One of ordinary skill will appreciate that a maximum number of partitions that a tape can support is based on the version of the LTO tape. For example, LTO-1 through LTO-4 do not support partitioning. Accordingly, these versions of LTO-formatted tape cartridges only support a single data partition. In another example, LTO-5 supports a maximum of two data partitions. Accordingly, this version of LTO-formatted tape can include a single data partition or two data partitions. In yet another example, LTO-6 through LTO-8 support a maximum of four data partitions. Accordingly, these versions of LTO-formatted tapes can include a single data partition, two data partitions, three data partitions, or four data partitions. The number of data partitions is ultimately determined by a user of system administrator.

If WP management program 301 determines that a LTO tape cannot support two or more data partitions (decision step S400 NO branch), WP management program 301 returns to decision step S400. If WP management program 301 determines that a LTO tape can support two or more data partitions (decision step S400 YES branch), WP management program 301 proceeds to decision step S402.

At decision step S402, WP management program 301 determines whether a LTO tape is formatted with two or more data partitions. For example, WP management program 301 identifies the number of actual partitions of an LTO tape from the CM of the LTO tape. If WP management program 301 determines that a LTO tape is not formatted with two or more data partitions (decision step S402 NO branch), WP management program 301 returns to decision step S400. If WP management program 301 determines that a LTO tape is formatted with two or more data partitions (decision step S402 YES branch), WP management program 301 proceeds to step S404.

At step S404, WP management program 301 limits a set of WP values that can be assigned to or otherwise associated with datasets written to a particular data partition. In some embodiments, WP management program 301 limits a set of WP values that can be assigned to a particular data partition based, at least in part, on a maximum number of data partitions that can be created for a particular version of a LTO formatted tape cartridge. In other embodiments, WP management program 301 limits a set of WP values that can be assigned to a particular data partition based, at least in part, on a number of data partitions actually created (i.e., a number of formatted data partitions) on a LTO formatted tape cartridge.

In various embodiments, the set of possible WP values for each data partition are established such that any WP value assigned to a dataset written to a particular partition, when divided by a number of partitions created (M), has a common remainder value. In various embodiments, the common remainder value for a particular partition is equal to the Partition number itself. For example, if a tape is partitioned into 3 data partitions—$Partition_0$, $Partition_1$, and $Partition_2$—WP management program 301 limits the set of WP values for $Partition_0$ to WP values that have a remainder value of zero (0) when divided by M (3). Similarly, WP management program 301 limits the set of WP values for Partition$_1$ to WP values that have a remainder value of one (1) when divided by M (3). Likewise, WP management program 301 limits the set of WP values for Partition$_2$ to WP values that have a remainder of two (2) when divided by M (3).

An exemplary set of WP values for a tape partitioned into two (2) data partitions in accordance with at least one embodiment of the invention is illustrated as follows:

Partition 0 (WP %=0): $WP_2$, $WP_4$, $WP_6$, $WP_8$, $WP_{10}$, . . .
Partition 1 (WP %=1): $WP_3$, $WP_5$, $WP_7$, $WP_9$, $WP_{11}$, . . .

An exemplary set of WP values for a tape partitioned into three (3) data partitions in accordance with at least one embodiment of the invention is illustrated as follows:

Partition 0 (WP %=0): $WP_3$, $WP_6$, $WP_9$, $WP_{12}$, $WP_{15}$, . . .
Partition 1 (WP %=1): $WP_4$, $WP_7$, $WP_{10}$, $WP_{13}$, $WP_{16}$, . . .
Partition 2 (WP %=2): $WP_5$, $WP_8$, $WP_{11}$, $WP_{14}$, $WP_{17}$, . . .

An exemplary set of WP values for a tape partitioned into four (4) data partitions in accordance with at least one embodiment of the invention is illustrated as follows:

Partition 0 (WP %=0): $WP_4$, $WP_8$, $WP_{12}$, $WP_{16}$, $WP_{20}$, . . .
Partition 1 (WP %=1): $WP_5$, $WP_9$, $WP_{13}$, $WP_{17}$, $WP_{21}$ . . .
Partition 2 (WP %=2): $WP_6$, $WP_{10}$, $WP_{14}$, $WP_{18}$, $WP_{22}$ . . .
Partition 3 (WP %=3): $WP_7$, $WP_{11}$, $WP_{15}$, $WP_{19}$, $WP_{23}$ . . .

One of ordinary skill will appreciate that although current LTO tape storage devices only support a maximum of four data partitions, embodiments of the present invention can be practiced in accordance with LTO tape storage devices capable of supporting greater than four data partitions.

At step S406, WP management program 301 stores information relating to the set of WP values limited to each data partition of a tape in a non-volatile memory (e.g., CM) of the tape cartridge. In some embodiments, the entire set of WP values for each partition is stored in the CM of the tape cartridge in a tabular format as depicted above. In other embodiments, the entire set of WP values for each partition is not stored in the CM on the tape cartridge. Rather, a formatting rule for assigning WP values to datasets written to each Partition is stored in the CM on the tape cartridge in order to reduce the amount of storage space of the CM utilized for storing formatting data.

For example, a formatting rule may state as follows: WP value, when divided by M, must have a remainder (%) equal to the partition number in which the dataset is written to. In another example, a formatting rule may state as follows: WP value assigned to a newly written dataset must be greater than the highest previously stored WP value and when divided by M, must have a remainder (%) equal to the partition number in which the dataset is written to. In yet another example, a formatting rule may state as follows: WP value assigned to a newly written dataset must be greater than the highest previously stored WP value for a particular partition and when divided by M, must have a remainder (%) equal to the particular partition number in which the dataset is written to.

At step S408, WP management program 301 retrieves the information relating to a set of WP values (e.g., as limited to each data partition in accordance with step S404) from a CM on the tape cartridge. For example, the information is retrieved from the CM on the tape cartridge in response to loading a new LTO tape cartridge (i.e., a tape devoid of any recorded data) onto a tape drive. In other embodiments, WP management program 301 retrieves information relating to a set of formatting rules (e.g., as listed in accordance with step S406) from a CM on the tape cartridge.

At step S410, WP management program 301 writes the information relating to the set of WP values limited to each data partition to a FID on the tape media inside the LTO tape cartridge. In other embodiments, WP management program 301 writes the information relating to the set of formatting rules to a FID on the tape media inside the LTO tape cartridge.

Figure 5:
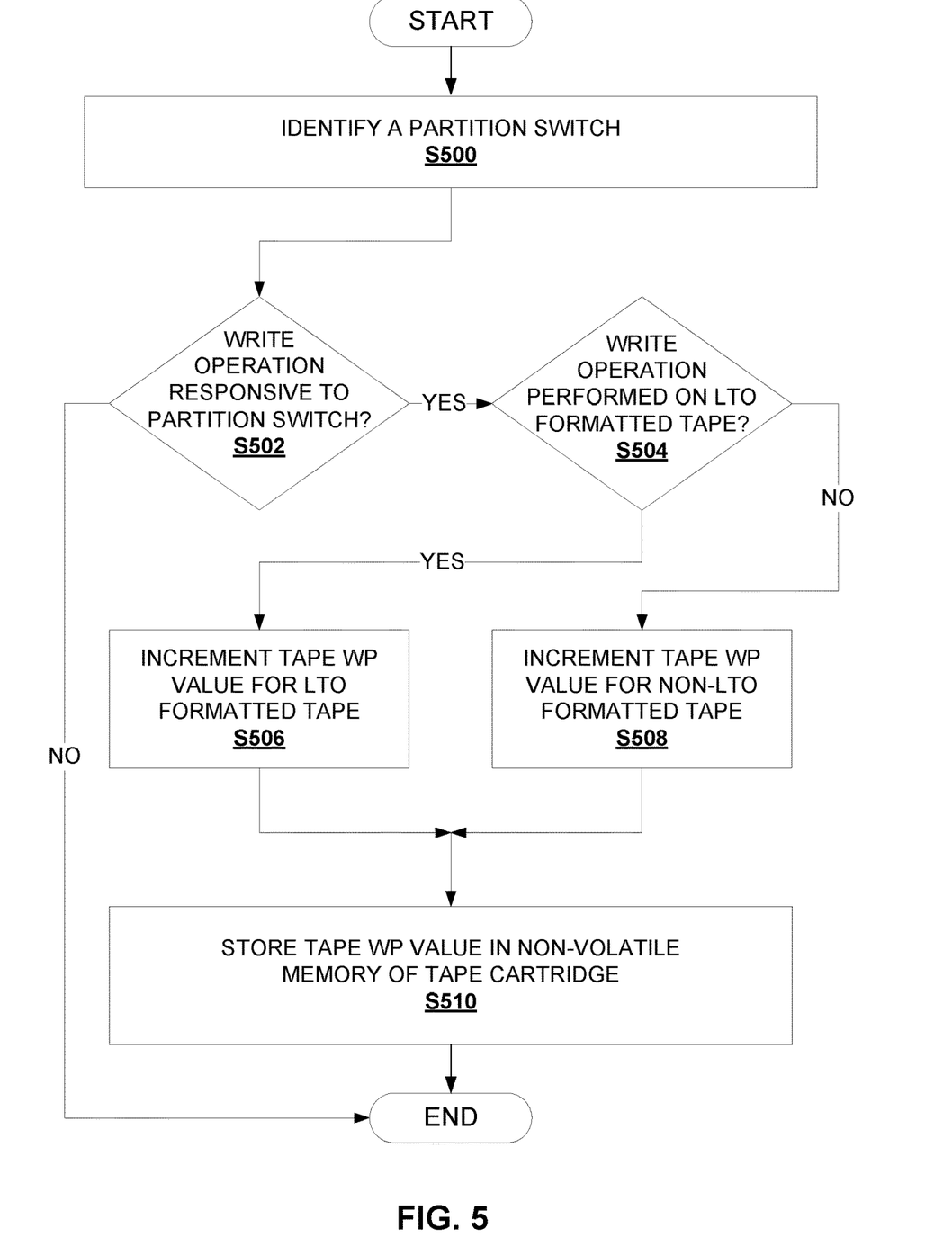
FIG. 5 is a flow chart diagram depicting operational steps for incrementing WP values after switching write operations between partitions in accordance with at least one embodiment of the present invention.

FIG. 5 is a flow chart diagram depicting operational steps for incrementing WP values after switching write operations between partitions in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims. It should be noted that although the following flow chart diagram is illustrative of incrementing WP values for a LTO tape cartridge, one of ordinary skill in the art will appreciate that various embodiments of the present invention may be practiced with any form of tape storage device that utilizes a tape WP system.

At step S500, WP management program 301 identifies a partition switch. Generally, a partition switch may generally be understood as the movement of a tape head from one partition to another partition. For example, a tape partition switch occurs when a tape drive head reads data from Partition$_1$ and moves to Partition$_2$ to read data from Partition$_2$. In another example, a tape partition switch occurs when a tape drive head reads data from Partition$_2$ and moves to Partition$_1$ to write data to Partition$_1$. In yet another example, a tape partition switch occurs when a tape drive head writes data to Partition$_1$ and moves to Partition$_2$ to write data to Partition$_2$.

At decision step S502, WP management program 301 determines whether a write operation occurs responsive to or after a partition switch. For example, a write operation occurs when a tape head switches partitions to write data to an empty partition. In another example, a write operation occurs when a tape head switches partitions to append data in a partition. In yet another example, a write operation occurs when a tape head switches partitions to rewrite data written in a partition (e.g., for purposes of error recovery). If WP management program 301 determines that a write operation did not occur responsive to a partition switch (decision step S502 NO branch), the process ends. If WP management program 301 determines that a write operation occurred responsive to a partition switch (decision step S502 YES branch), WP management program 301 proceeds to decision step S504.

At decision step S504, WP management program 301 determines whether a write operation was performed on a LTO formatted tape cartridge. If WP management program 301 determines that a write operation is performed on a non-LTO formatted tape cartridge (decision step S504 NO branch), WP management program 301 proceeds to step S508. If WP management program 301 determines that a write operation was performed on a LTO-formatted tape cartridge (decision step S504 YES branch), WP management program 301 proceeds to step S506.

At step S506, WP management program 301 increments a WP value for a LTO formatted tape cartridge. In various embodiments, a WP value is incremented based, at least in part, on the rule of addition from a maximum or highest WP value assigned to data written to the tape. It should be appreciated that the maximum WP value for a LTO formatted tape cartridge is the maximum WP value assigned to data written in any partition. It should further be appreciated that the rule of addition, when applied to a LTO formatted tape, shall refer to a rule that a WP value can only be incremented and never decremented. For example, if the highest WP value assigned to a dataset is X+10, the next WP value assigned should be greater than X+10.

In various embodiments, incrementing a WP value is further based, at least in part, on assigning a WP value to a dataset, that when divided by a total number of partitions on the tape (M), has a remainder (%) equal to the partition number in which the dataset is written to. For example, magnetic tape media includes three data partitions—$Partition_0$, $Partition_1$, and $Partition_2$. A maximum WP value of $WP_{10}$ is assigned to a $Dataset_{15}$ written to $Partition_1$. If the tape head switches from $Partition_1$ to $Partition_0$ to write $Dataset_{16}$ in $Partition_0$, the WP value assigned to $Dataset_{16}$ should be greater than 10. Accordingly, the next value higher than 10 that has a remainder of 0 (since $Dataset_{16}$ is written in $Partition_0$) would be 12. In other words, the value 12, when divided by a value of 3 (the total number of partitions on the tape), has a remainder of 0.

At step S508, WP management program 301 increments a WP value for a non-formatted LTO tape cartridge. In various embodiments, a WP value is incremented based, at least in part, on the rule of addition from a maximum or highest WP value assigned to a data partition in which a dataset is written to. It should be appreciated that the maximum WP value for non-LTO formatted tape cartridge is the maximum WP value assigned to a particular partition. For example, if there are four data partitions, each data partition has a maximum WP value.

In embodiments having a non-LTO formatted tape cartridge, incrementing a WP value is further based, at least in part, on assigning a WP value to a dataset, that when divided by a total number of partitions on the tape, has a remainder equal to the partition number in which the dataset is written to. For example, magnetic tape media includes four data partitions—$Partition_0$, $Partition_1$, $Partition_2$, $Partition_3$, and $Partition_4$. In this example, a maximum WP value of $WP_{22}$ is assigned to a $Dataset_{15}$ written to $Partition_2$, which is the maximum WP value assigned to any dataset written to the tape. If the tape head switches from $Partition_2$ to $Partition_0$ to write $Dataset_{16}$ in $Partition_0$, the WP value assigned to $Dataset_{16}$ is not calculated from the maximum WP value on the tape (i.e., $WP_{22}$ assigned to $Dataset_{15}$ written in $Partition_2$). Rather, the WP value assigned to $Dataset_{16}$ written in $Partition_0$ is calculated from the maximum WP value assigned to a dataset written in $Partition_0$. For example, the maximum WP value assigned to a dataset written in $Partition_0$ is $WP_4$. Accordingly, the next value higher than 4 that has a remainder of 0 (since $Dataset_{16}$ is written in $Partition_0$) would be 8. In other words, the value 8, when divided by a value of 4 (the total number of partitions on the tape), has a remainder of 0.

At step S510, WP management program 301 stores the WP value in a CM of the tape cartridge. In those embodiments where WP values are incremented for LTO-formatted tape cartridges, WP management program 301 stores the maximum WP value assigned to a dataset written to the tape, irrespective of the particular partition in which the dataset is recorded. In those embodiments where WP values are incremented for non-LTO formatted tape cartridges, WP management program 301 stores the maximum WP value assigned to a dataset for each partition of the tape.

Figure 6:
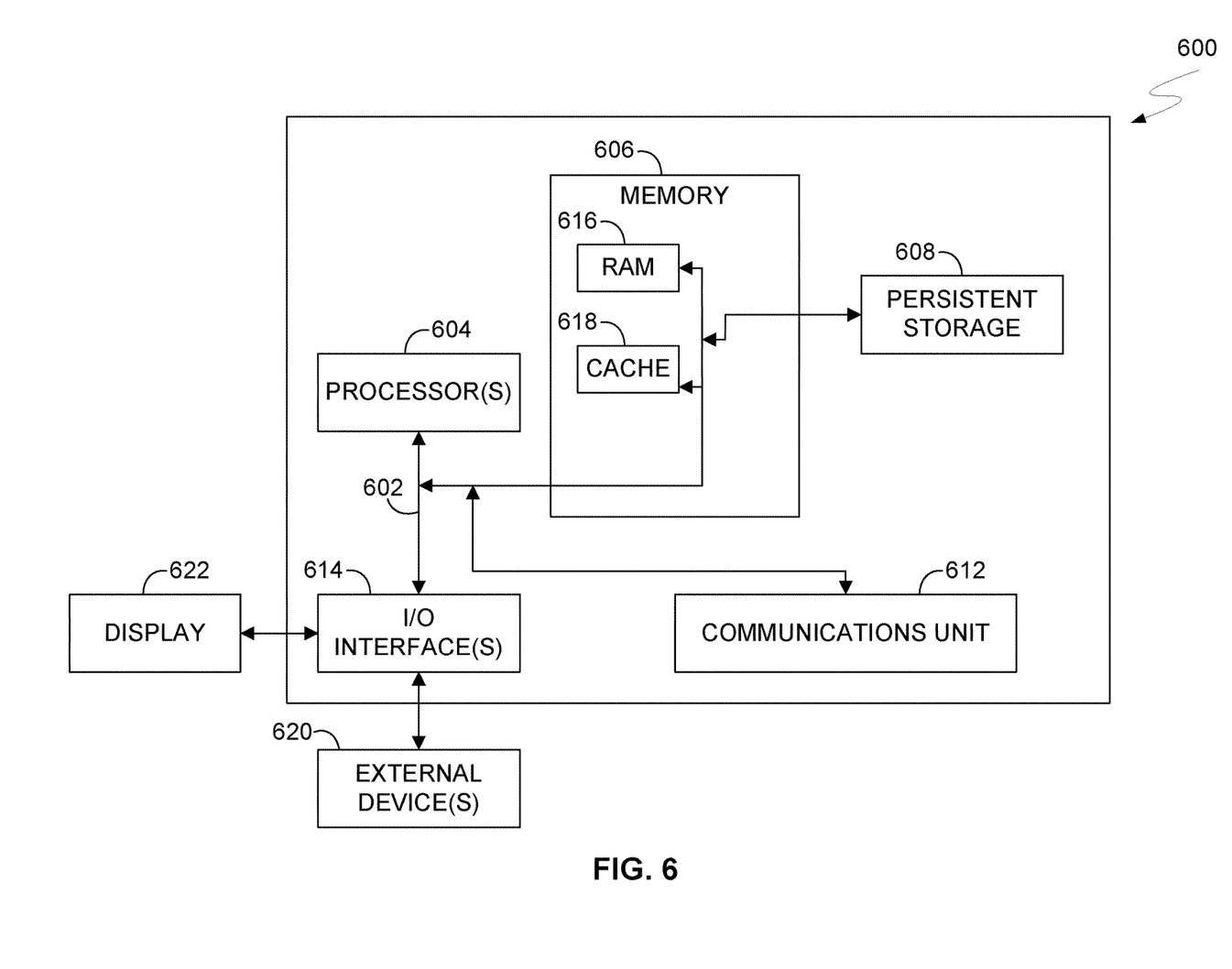
FIG. 6 is a block diagram depicting components of a computing device, generally designated 600, suitable for executing the computing devices depicted in FIG. 3 in accordance with at least one embodiment of the invention.

FIG. 6 is a block diagram depicting components of a computing device, generally designated 600, suitable for executing WP management program 301, host device 302, tape library 304, client device 306, and/or any computing devices generally depicted in FIG. 3 in accordance with at least one embodiment of the present invention. Computing device 600 includes one or more processor(s) 604 (including one or more computer processors), communications fabric 602, memory 606 including, RAM 616 and cache 618, persistent storage 608, communications unit 612, I/O interface(s) 614, display 622, and external device(s) 620. It should be appreciated that FIG. 6 provides only an illustration of one embodiment and does not imply any limitations with regard to the environments in which different embodiments may be implemented. Many modifications to the depicted environment may be made.

As depicted, computing device 600 operates over communications fabric 602, which provides communications between computer processor(s) 604, memory 606, persistent storage 608, communications unit 612, and input/output (I/O) interface(s) 614. Communications fabric 602 can be implemented with any architecture suitable for passing data or control information between processor(s) 604 (e.g., microprocessors, communications processors, and network processors), memory 606, external device(s) 620, and any other hardware components within a system. For example, communications fabric 602 can be implemented with one or more buses.

Memory 606 and persistent storage 608 are computer readable storage media. In the depicted embodiment, memory 606 includes random-access memory (RAM) 616 and cache 618. In general, memory 606 can include any suitable volatile or non-volatile one or more computer readable storage media.

Program instructions for WP management program 301 can be stored in persistent storage 608, or more generally, any computer readable storage media, for execution by one or more of the respective computer processor(s) 604 via one or more memories of memory 606. Persistent storage 608 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 can include one or more network interface cards. Communications unit 612 may provide communications through the use of either or both physical and wireless communications links. In the context of some embodiments of the present invention, the source of the various input data may be physically remote to computing device 600 such that the input data may be received, and the output similarly transmitted via communications unit 612.

I/O interface(s) 614 allows for input and output of data with other devices that may operate in conjunction with computing device 600. For example, I/O interface(s) 614 may provide a connection to external device(s) 620, which may be as a keyboard, keypad, a touch screen, or other suitable input devices. External device(s) 620 can also include portable computer readable storage media, for example thumb drives, portable optical or magnetic disks, and memory cards. Software and data used to practice embodiments of the present invention can be stored on such portable computer readable storage media and may be loaded onto persistent storage 608 via I/O interface(s) 614. I/O interface(s) 614 also can similarly connect to display 622. Display 622 provides a mechanism to display data to a user and may be, for example, a computer monitor.

What is claimed is:

1. A computer-implemented method for incrementing a tape write pass (WP) value, the computer-implemented method comprising:
   identifying an action that requires incrementing a tape WP value on a magnetic tape storage device; and
   responsive to identifying the action that requires incrementing the tape WP value on the magnetic tape storage device:
      assigning a new tape WP value to a dataset, that when divided by a total number of data partitions created on the magnetic tape storage device, has a remainder value equal to a partition number corresponding to a data partition in which the dataset is written to.

2. The computer-implemented method of claim 1, wherein assigning the new tape WP value to the dataset is further based on:
   determining that the magnetic tape storage device is a not a linear tape open (LTO) formatted storage device; and
   responsive to determining that the magnetic tape storage device is not a LTO formatted storage device:
      identifying a highest WP value assigned to a previous dataset written to the data partition; and
      assigning a tape WP value that is greater than the highest WP value assigned to the previous dataset written to the data partition.

3. The computer-implemented method of claim 1, wherein assigning the new tape WP value to the dataset is further based on:
   determining that the magnetic tape storage device is a LTO formatted storage device; and
   responsive to determining that the magnetic tape storage device is a LTO formatted storage device:
      identifying a highest WP value assigned to a previous dataset written to any data partition; and
      assigning a WP value that is greater than the highest WP value assigned to the previous dataset written to any data partition.

4. The computer-implemented method of claim 1, further comprising:
   limiting a set of WP values that can be assigned to datasets written to the data partition based on any WP value in the set of WP values, when divided by a total number of data partitions created on the magnetic tape storage device, having a common remainder value equal to the partition number corresponding to the data partition.

5. The computer-implemented method of claim 4, further comprising:
   retrieving information related to the set of WP values that can be assigned to datasets written to the data partition from a non-volatile memory of the magnetic tape storage device; and
   writing the information related to the set of WP values that can be assigned to datasets written to the particular partition to a format identification dataset located in a user data area of the magnetic tape storage device.

6. The computer-implemented method of 1, wherein an action that requires incrementing a WP value associated with a dataset written to a data partition on a magnetic tape storage device is selected from the group consisting of: appending a dataset recorded on a data partition, rewriting a dataset recorded on a data partition, increase in wrap number when data writing, and switching write operations between data partitions.

7. A computer program product for incrementing a tape write pass (WP) value, the computer program product comprising one or more computer readable storage media and program instructions stored on the one or more computer readable storage media, the program instructions including instructions to:
   identify an action that requires incrementing a tape WP value on a magnetic tape storage device; and
   responsive to identifying the action that requires incrementing the tape WP value on the magnetic tape storage device:
      assign a new tape WP value to a dataset, that when divided by a total number of data partitions created on the magnetic tape storage device, has a remainder value equal to a partition number corresponding to a data partition in which the dataset is written to.

8. The computer program product of claim 7, wherein the instructions to assign the new tape WP value to the dataset is further based on instructions to:
   determine that the magnetic tape storage device is not a linear tape open (LTO) formatted storage device; and
   responsive to determining that the magnetic tape storage device is not a LTO formatted storage device:
      identify a highest WP value assigned to a previous dataset written to the data partition; and
      assign a tape WP value that is greater than the highest WP value assigned to the previous dataset written to the data partition.

9. The computer program product of claim 7, wherein the instructions to assign the new tape WP value to the dataset is further based on instructions to:
   determine that the magnetic tape storage device is a LTO formatted storage device; and
   responsive to determining that the magnetic tape storage device is a LTO formatted storage device:
      identify a highest WP value assigned to a previous dataset written to any data partition; and
      assign a WP value that is greater than the highest WP value assigned to the previous dataset written to any data partition.

10. The computer program product of claim 7, further comprising program instructions to:
    limit a set of WP values that can be assigned to datasets written to the data partition based on any WP value in the set of WP values, when divided by a total number of data partitions created on the magnetic tape storage device, having a common remainder value equal to the partition number corresponding to the data partition.

11. The computer program product of claim 10, further comprising program instructions to:
    retrieve information related to the set of WP values that can be assigned to datasets written to the data partition from a non-volatile memory of the magnetic tape storage device; and write the information related to the set of WP values that can be assigned to datasets written to the particular partition to a format identification dataset located in a user data area of the magnetic tape storage device.

12. The computer program product of claim 7, wherein an action that requires incrementing a WP value associated with a dataset written to a data partition on a magnetic tape storage device is selected from the group consisting of: appending a dataset recorded on a data partition, rewriting a dataset recorded on a data partition, increase in wrap number when data writing, and switching write operations between data partitions.

13. A computer system for incrementing a tape write pass (WP) value, the computer system comprising:
one or more computer processors;
one or more computer readable storage media;
computer program instructions;
the computer program instructions being stored on the one or more computer readable storage media for execution by the one or more computer processors; and
the computer program instructions including instructions to:
identify an action that requires incrementing a tape WP value on a magnetic tape storage device; and
responsive to identifying the action that requires incrementing the tape WP value on the magnetic tape storage device:
assign a new tape WP value to a dataset, that when divided by a total number of data partitions created on the magnetic tape storage device, has a remainder value equal to a partition number corresponding to a data partition in which the dataset is written to.

14. The computer system of claim 13, wherein the instructions to assign the new tape WP value to the dataset is further based on instructions to:
determine that the magnetic tape storage device is not a linear tape open (LTO) formatted storage device; and
responsive to determining that the magnetic tape storage device is not a LTO formatted storage device:
identify a highest WP value assigned to a previous dataset written to the data partition; and
assign a tape WP value that is greater than the highest WP value assigned to the previous dataset written to the data partition.

15. The computer system of claim 13, wherein the instructions to assign the new tape WP value to the dataset is further based on instructions to:
determine that the magnetic tape storage device is a LTO formatted storage device; and
responsive to determining that the magnetic tape storage device is a LTO formatted storage device:
identify a highest WP value assigned to a previous dataset written to any data partition; and
assign a WP value that is greater than the highest WP value assigned to the previous dataset written to any data partition.

16. The computer system of claim 13, further comprising program instructions to:
limit a set of WP values that can be assigned to datasets written to the data partition based on any WP value in the set of WP values, when divided by a total number of data partitions created on the magnetic tape storage device, having a common remainder value equal to the partition number corresponding to the data partition.

17. The computer system of claim 16, further comprising program instructions to:
retrieve information related to the set of WP values that can be assigned to datasets written to the data partition from a non-volatile memory of the magnetic tape storage device; and
write the information related to the set of WP values that can be assigned to datasets written to the particular partition to a format identification dataset located in a user data area of the magnetic tape storage device.

18. The computer-implemented method of claim 1, further comprising determining that an off-track read is occurring based, at least in part, on:
receiving a read request for the dataset recorded on a first wrap of the magnetic tape storage device; and
determining that a tape head is erroneously reading from a wrong dataset recorded on a second wrap of the magnetic storage device based on a WP number assigned to the wrong dataset, that when divided by the total number of data partitions created on the magnetic tape storage device, has a remainder value that is different than the partition number corresponding to the data partition in which the dataset is written to.

19. The computer program product of claim 7, further comprising program instructions to determine that an off-track read is occurring based, at least in part, on instructions to:
receive a read request for the dataset recorded on a first wrap of the magnetic tape storage device; and
determine that a tape head is erroneously reading from a wrong dataset recorded on a second wrap of the magnetic storage device based on a WP number assigned to the wrong dataset, that when divided by the total number of data partitions created on the magnetic tape storage device, has a remainder value that is different than the partition number corresponding to the data partition in which the dataset is written to.

20. The computer system of claim 13, further comprising program instructions to determine that an off-track read is occurring based, at least in part, on instructions to:
receive a read request for the dataset recorded on a first wrap of the magnetic tape storage device; and
determine that a tape head is erroneously reading from a wrong dataset recorded on a second wrap of the magnetic storage device based on a WP number assigned to the wrong dataset, that when divided by the total number of data partitions created on the magnetic tape storage device, has a remainder value that is different than the partition number corresponding to the data partition in which the dataset is written to.

* * * * *